United States Patent Office 3,161,639
Patented Dec. 15, 1964

3,161,639
3,6-DI(BENZOTHIAZOLYLTHIO) PYRIDAZINE
Douglas I. Relyea, Pompton Plains, N.J., assignor to United States Rubber Company, New York, N.Y., a corporation of New Jersey
No Drawing. Filed Oct. 29, 1962, Ser. No. 233,877
1 Claim. (Cl. 260—250)

This invention relates to new chemicals.

The chemicals of the present invention are 3,6-disubstituted pyridazines represented by the formula

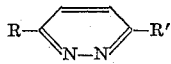

wherein R and R' are the same and are dialkylaminoanilino, or 2-benzothiazolylthio. The alkyl groups in the dialkylaminoanilino radicals will generally have from 1 to 8 carbon atoms, e.g., methyl, ethyl, propyl, butyl, hexyl, octyl.

The chemicals of the present invention are prepared by reacting 3,6-dichloropyridazine, a known chemical, with the sodium salt of mercaptobenzothiazole or with the selected dialkylaminoaniline in an inert solvent, e.g., ethanol, xylene, toluene, benzene, pyridine, or dioxane.

The following examples illustrate the present invention.

Example 1

Preparation of 3,6-pyridazinebis(2-thiobenzothiazole), or 3,6-di(benzothiazolylthio) pyridazine.

The sodium salt of mercaptobenzothiazole was first prepared by dissolving 11.5 gm. (0.50 gm.-atom) of sodium in 500 ml. of absolute ethanol to give sodium ethoxide. To the sodium ethoxide solution was added 83.5 gm. (0.50 mole) of recrystallized mercaptobenzothiazole. The resulting clear yellow solution was then treated with 37.3 gm. (0.250 mole) of 3,6-dichloropyridazine in 250 ml. of absolute ethanol, and the mixture was refluxed for thirty-six hours. After the mixture was cooled to room temperature, the white precipitate was separated by filtration and washed with two 200 ml. portions of ethanol and two 200 ml. portions of water. A yield of 56.2 gm. of 3,6-pyridazinebis(2-thiobenzothiazole) having a melting point of 180.5–182.5° C. was obtained.

Analysis for $C_{18}H_{10}N_4S_4$:

|  | Calculated | Found |
|---|---|---|
| Percent C | 52.86 | 52.80 |
| Percent H | 2.46 | 2.64 |
| Percent S | 31.19 | 31.34 |
| Percent N | 13.67 | 13.39 |

Example 2

Preparation of 3,6 - pyridazinebis(4 - dimethylaminoaniline), or 3,6-di(p-dimethylaminoanilino) pyridazine.

A solution of 136 gm. (1.0 mole) of redistilled p-dimethylaminoaniline in 250 ml. of reagent pyridine was treated with 74.5 gm. (0.50 mole) of 3,6-dichloropyridazine. After approximately 20 minutes an exotherm to 80° occurred. The mixture was then allowed to stand over the weekend at room temperature. The reaction mixture which had set to a semi solid mass was broken up and washed thoroughly with water to remove the pyridine and pyridine hydrochloride. The residue was then dissolved in 500 ml. of water and 100 ml. of concentrated hydrochloric acid and the resultant dark brown solution filtered. The clear brown filtrate was run into 2.5 liters of water containing 80 gm. of sodium hydroxide and the dark yellow precipitate separated by filtration and dried at 50° C. and 50 mm. pressure. The product was recrystallized twice in 500 ml. of boiling o-dichlorobenzene, and filtered hot, resulting in 64 gm. of 3,6-pyridazinebis(4-dimethylaminoaniline), a yellow crystalline material, plate-like in structure, and having a melting point of 234°–236° C.

Analysis for $C_{20}H_{24}N_6$:

|  | Calculated | Found |
|---|---|---|
| Percent C | 68.94 | 68.56 |
| Percent H | 6.94 | 6.84 |
| Percent N | 24.12 | 23.99 |

The compounds of the present invention are useful as rubber chemicals as illustrated in the following examples.

Example 3

This example shows that the chemical of Example 2 is an effective antioxidant and antiozonant for sulfur-vulcanizable rubbers, such as natural rubber.

Rubber stock F was compounded on a two-roll mill by mixing into 100 parts of Hevea rubber, 2 parts of stearic acid 45 parts of HAF (high abrasion furnace) carbon black 3 parts of zinc oxide 6 parts of Paraflux softener (a saturated polymerized petroleum hydrocarbon having a specific gravity of 1.02 and a Saybolt Furol Viscosity of 250–350 seconds at 140° F.), 2.75 parts of sulfur and 0.75 part of N-cyclohexyl-2-benzothiazole-sulfenamide accelerator and 2 parts of 3,6-pyridazinebis-(4-dimethylaminoaniline). For comparison purposes, there was incorporated in stock G a conventional commercial antioxidant combination, viz. 2.0 parts of BLE (a high temperature reaction product of diphenylamine and acetone having a specific gravity of 1.09) and 0.35 part of JZF (N,N'-diphenyl-p-phenylenediamine), instead of the 2 parts of 3,6-pyridazinebis(4-dimethylaminoaniline).

Specimens of stocks F and G were cured in a press for 30, 45 and 90 minutes at 393° F. and tested by the conventional testing methods used for rubber with results shown in the following table:

| Physical Properties | Time of cure, minutes | F | G |
|---|---|---|---|
| Unaged: | | | |
| Tensile Strength (p.s.i.) | 30 | 3,810 | 3,860 |
|  | 45 | 3,610 | 3,910 |
|  | 90 | 3,720 | 3,510 |
| Elongation at Break (percent) | 30 | 520 | 560 |
|  | 45 | 510 | 550 |
|  | 90 | 560 | 590 |
| Modulus at 300% (p.s.i.) | 30 | 1,750 | 1,500 |
|  | 45 | 1,700 | 1,475 |
|  | 90 | 1,450 | 1,200 |
| Aged—48 hrs. in Air at 212° F.: | | | |
| Tensile Strength (p.s.i.) | 30 | 3,010 | 2,590 |
|  | 45 | 2,890 | 2,520 |
|  | 90 | 2,730 | 1,890 |
| Elongation at Break (percent) | 30 | 390 | 340 |
|  | 45 | 380 | 360 |
|  | 90 | 400 | 340 |
| Modulus at 300% (p.s.i.) | 30 | 2,275 | 1 2,275 |
|  | 45 | 2,300 | 1 2,200 |
|  | 90 | 2,000 | 1 1,850 |
| Aged—72 hrs. in Air at 212° F.: | | | |
| Tensile Strength (p.s.i.) | 30 | 2,410 | 1,470 |
|  | 45 | 2,360 | 1,720 |
|  | 90 | 2,010 | 1,310 |
| Elongation at Break (percent) | 30 | 330 | 250 |
|  | 45 | 340 | 270 |
|  | 90 | 310 | 250 |
| Modulus at 300% (p.s.i.)[1] | 30 | 2,300 | 2,100 |
|  | 45 | 2,250 | 2,100 |
|  | 90 | 2,050 | 1,925 |
| Aged—96 hrs. in O₂ Bomb: | | | |
| Tensile Strength (p.s.i.) | 30 | 3,080 | 2,940 |
|  | 45 | 2,810 | 2,690 |
|  | 90 | 2,270 | 2,260 |
| Elongation at Break (percent) | 30 | 420 | 440 |
|  | 45 | 390 | 410 |
|  | 90 | 400 | 400 |
| Modulus at 300% (p.s.i.) | 30 | 2,070 | 1,750 |
|  | 45 | 1,850 | 1,650 |
|  | 90 | 1,510 | 1,500 |

| Physical Properties | Time of cure, minutes | F | G |
|---|---|---|---|
| Aged—144 hrs. in O₂ Bomb: | | | |
| Tensile Strength (p.s.i.) | 30 | 3,215 | 2,805 |
| | 45 | 2,515 | 2,485 |
| | 90 | 1,870 | 2,095 |
| Elongation at Break (percent) | 30 | 450 | 440 |
| | 45 | 410 | 420 |
| | 90 | 380 | 400 |
| Modulus at 300% (p.s.i.) | 30 | 2,010 | 1,700 |
| | 45 | 1,750 | 1,625 |
| | 90 | 1,350 | 1,450 |

¹ Extrapolated values.

The results show that a rubber stock containing the chemical of the present invention ages in air and an oxygen atmosphere equally as well as a similar rubber stock containing the conventional commercial antioxidant combination as measured by such physical properties as retention of tensile strength and degree of stiffness (modulus rise).

*Example 4*

This example shows that the chemical of Example 1 is an effective accelerator for vulcanizing or curing sulfur vulcanizable rubbers, such as natural rubber.

Two rubber stocks H and I were compounded on a two-roll mill by mixing into 100 parts of Hevea rubber, 5 parts of zinc oxide, 3.5 parts of zinc laurate, 45 parts of ISAF (intermediate super abrasion furnace) carbon black, 3.5 parts of pine tar (softener) and 2.25 parts of sulfur. There was incorporated in stock H 0.5 part of 3,6-pyridazinebis(2 - thiobenzothiazole). For comparison purposes there was incorporated in stock I 0.5 part of conventional commercial accelerator 2,4-dinitrophenyl benzothiazyl sulfide.

Specimens of stocks H and I were cured in a press for 22, 45 and 90 minutes at 274° F. and tested by the conventional testing methods used for rubber with results as shown in the following table:

| Physical Properties | Time of Cure, Minutes | H | I |
|---|---|---|---|
| Tensile Strength (p.s.i.) | 22 | 1,040 | 1,090 |
| | 45 | 1,905 | 1,705 |
| | 90 | 3,225 | 2,710 |
| Elongation at Break (percent) | 22 | 850 | 800 |
| | 45 | 660 | 620 |
| | 90 | 570 | 570 |
| Modulus at 300% (p.s.i.) | 22 | 115 | 135 |
| | 45 | 365 | 315 |
| | 90 | 940 | 800 |
| Hardness (Shore A) | 22 | 42 | 41 |
| | 45 | 48 | 46 |
| | 90 | 56 | 54 |

The results show that the chemical of the present invention is as effective a vulcanization accelerator as the conventional commercial accelerator.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

3,6-di(benzothiazolylthio) pyridazine.

References Cited in the file of this patent

FOREIGN PATENTS

| 520,817 | Belgium | Dec. 19, 1953 |
| 822,069 | Great Britain | Oct. 21, 1959 |

OTHER REFERENCES

Kumagai: J. Chem. Soc., Japan, vol. 82 (Feb. 1961), pgs. 227–9.